US012508687B1

(12) United States Patent
Declet, Jr.

(10) Patent No.: US 12,508,687 B1
(45) Date of Patent: Dec. 30, 2025

(54) METHOD AND SYSTEM FOR SANDING OBJECTS MADE OF THERMOPLASTIC OLEFIN (TPO)

(71) Applicant: Antonio Declet, Jr., Aptos, CA (US)

(72) Inventor: Antonio Declet, Jr., Aptos, CA (US)

( * ) Notice: Subject to any disclaimer, the term of this patent is extended or adjusted under 35 U.S.C. 154(b) by 832 days.

(21) Appl. No.: 15/913,803

(22) Filed: Mar. 6, 2018

Related U.S. Application Data

(60) Provisional application No. 62/512,666, filed on May 30, 2017.

(51) Int. Cl.

| | |
|---|---|
| ***B24D 3/00*** | (2006.01) |
| ***B24B 9/20*** | (2006.01) |
| ***B24B 19/26*** | (2006.01) |
| ***B32B 29/08*** | (2006.01) |

(52) U.S. Cl.
CPC ................ *B24D 3/002* (2013.01); *B24B 9/20* (2013.01); *B24B 19/265* (2013.01); *B32B 29/08* (2013.01)

(58) Field of Classification Search
CPC ......... B24D 3/002; B24B 19/265; B24B 9/20; B32B 29/08
See application file for complete search history.

(56) References Cited

U.S. PATENT DOCUMENTS 3,653,857 A * 4/1972 Field ...................... B24D 13/20 451/490
5,453,105 A * 9/1995 Middlemiss ........... B23D 61/04 51/307
7,410,413 B2 * 8/2008 Woo ...................... B24D 11/001 451/527
8,561,575 B2 * 10/2013 Ruffin .................. A01K 15/024 119/706
2002/0177387 A1 * 11/2002 Kelpert .................. B24D 3/344 451/28
2004/0107649 A1 * 6/2004 Emerson .............. B24D 11/003 51/295
2004/0110443 A1 * 6/2004 Pelnam, Sr. .............. B32B 5/12 442/400

(Continued)

OTHER PUBLICATIONS

Brown Bag (https://groups.google.com/g/rec.woodworking/c/lc711Mt50_U) Nov. 3, 2010.*

(Continued)

*Primary Examiner* — Kevin R Kruer
(74) *Attorney, Agent, or Firm* — Nelson T. Rivera

(57) ABSTRACT

A method and system used for sanding objects such as auto body parts made of plastic. The method and system allow shop owners and technicians in the auto body industry to sand car bumpers with an abrasive paper having at least one sanding surface made of kraft paper prior to the priming process. The abrasive paper can be configured into corrugated fiberboard material. The abrasive paper will remove the rough or course areas left on car bumpers made of thermoplastic olefin (TPO) during the sanding process which will save auto body shops and technicians time and money spent on materials, specifically primer and sandpaper. The abrasive paper used to sand car bumpers can be made of virgin kraft and can be configured substantially in the shape of a disc, square or rectangle that will be affixed to a sanding device.

20 Claims, 5 Drawing Sheets

(56) References Cited

U.S. PATENT DOCUMENTS

| | | | | |
|---|---|---|---|---|
| 2004/0166788 A1* | 8/2004 | Travis | B24B 23/02 451/359 |
| 2006/0002978 A1* | 1/2006 | Shea | A61L 27/54 514/8.4 |
| 2006/0057336 A1* | 3/2006 | Daley | A45D 29/04 428/143 |
| 2013/0344782 A1* | 12/2013 | Himmer | B24D 13/06 451/466 |
| 2015/0173484 A1* | 6/2015 | Fitzsimons | A45D 29/02 132/200 |
| 2016/0051112 A1* | 2/2016 | Schade | B24D 11/003 15/104.93 |
| 2018/0354092 A1* | 12/2018 | Carroll | B24B 19/22 |
| 2019/0314955 A1* | 10/2019 | Hoglund | B24D 11/001 |

OTHER PUBLICATIONS https://meguiarsonline.com/forums/showthread.php?10194-Sanding-Plastic (Dec. 13, 2005).* https://www.doityourself.com/stry/simple-plastic-polishing-methods (Sep. 17 2010).*

* cited by examiner

METHOD AND SYSTEM FOR SANDING OBJECTS MADE OF THERMOPLASTIC OLEFIN (TPO)

PRIORITY CLAIM

This non-provisional application claims priority to Provisional Patent Application Ser. No. 62/512,666, entitled "Method and System for Sanding Automotive Body Parts Made of Thermoplastic Olefin", filed on May 30, 2017.

TECHNICAL FIELD

The present invention relates generally to the field of auto body parts, and more specifically without limitation, to a method and system for sanding objects such as auto body parts, namely car bumper systems, prior to the priming process with an abrasive paper made of kraft paper.

BACKGROUND OF THE INVENTION

In many industries, products are made and/or repaired with plastic. One of the most used plastics is thermoplastic olefin (TPO) which is often used in outdoor products such as roofings on all-terrain vehicles, automobiles, golf carts and other vehicles because TPO does not degrade under solar UV radiation. In fact, thermoplastic olefin (TPO) is a custom thermoformed plastic widely used in the automotive industry.

When an automobile is damaged in a collision, sanding devices are widely used in the industry to prepare the surface on a car body such as plastic car bumper systems for receiving one or more coats of paint primer, and one or more finishing coats of paint. Frequently, one or more of the intermediate layers of paint on the surface of a car body must be sanded or touched up by sanding the surface in order to smooth rough edges and other imperfections in the finish before the final coat of paint can be applied.

Currently, the majority of modern plastic car bumper systems are made of thermoplastic olefins (TPO). This type of plastic (i.e., TPO) is the most difficult to work on in the auto body industry. When repairing a damaged auto body part made of TPO, sanding with some sort of abrasive (e.g., sandpaper, SCOTCH-BRITE™, etc.) prior to refinishing is a necessary procedure in order to provide a smooth surface to the finished article. The problem with sanding auto body parts made of TPO is that the raw surface invariably ends up being rough (i.e., uneven, coarse, jagged, etc.) after being sanded since the surface tends to end up with plastic hairs, chunks and/or ends up stringy. To alleviate this problem, shop owners and/or technicians usually apply extra coats of primer to the rough or course areas which can be timing consuming and costly.

Many shop owners and technicians today would rather not work on auto body parts made of TPO, specifically car bumpers made of this material. In fact, owners and technicians of auto body repair shops would rather just throw these bumpers away since they take too much time and money to work on. For instance, to obtain a properly smooth surface on bumpers made of TPO, shop owners and/or technicians must use extra sandpaper, specifically finer grids of sandpaper. Further, extra primer must be used even after the sanding process is completed since the finer grids of sandpaper are unable to eliminate rough or course areas on the bumpers made of TPO.

In light of the shortcomings in the prior art, there is definitely a need for a method and system that allows shop owners and technicians in the auto body industry to sand plastic bumpers made of TPO with a specialized abrasive paper prior to the priming process that does not leave rough and/or course areas on these bumpers which can advantageously save auto body shops and technicians time and money spent on materials.

SUMMARY OF THE INVENTION

The present invention relates to a beneficial method and system used for sanding objects such as auto body parts made of thermoplastic olefin (TPO).

The present invention also relates to a method and system that will allow shop owners and technicians in the auto body industry to sand car bumpers with an abrasive paper that will not leave rough or course areas on these car bumpers made of TPO during the sanding process which will advantageously save auto body shops time and money.

Another aspect of the present invention is to provide a method and system that is suitably configured to allow car bumpers made of TPO to be sanded with an abrasive paper made of kraft paper (e.g., sheets) or corrugated cardboard made of kraft paper prior to the priming process.

An additional aspect of the present invention is to provide a method and system that utilizes kraft paper (e.g., sheets) or corrugated cardboard made of kraft paper configured in the shape of a disc, square or rectangle and used for sanding objects such as auto body parts made of TPO.

A further aspect of the present invention is to provide a method and system that enables the kraft paper or corrugated cardboard made of kraft paper to be affixed to a sanding device.

In this disclosure, abrasive paper can also be referred to as, but not limited to, sandpaper material, sandpaper sheets, sandpaper product, kraft paper or any form of corrugated fiberboard such as paperboard, corrugated cardboard, corrugated paperboard, corrugated board or containerboard (CCM or corrugated case material).

In this disclosure, the shortened term "auto" refers to an automobile(s).

For a better understanding of the present invention, its functional advantages and the specific objects attained by its uses, reference should be made to the accompanying drawings, claims and descriptive matter in which there are illustrated embodiments of the invention.

DETAILED DESCRIPTION

Introduction

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

In one embodiment of the present invention, a method is suitably configured to sand objects such as auto body parts made of plastic. The method will include the steps of selecting an object to be repaired; and sanding the object made of plastic with a beneficial abrasive paper made of kraft paper or corrugated cardboard.

In another embodiment of the present invention, a system is suitably configured to sand auto body parts made of plastic. The system will include an abrasive paper made of kraft paper or corrugated cardboard configured to sand auto body parts made of plastic.

In a further embodiment, an abrasive paper will be advantageously comprised of kraft paper or corrugated cardboard configured to sand an auto body part made of plastic.

DETAILED DESCRIPTION

Figure 1A:
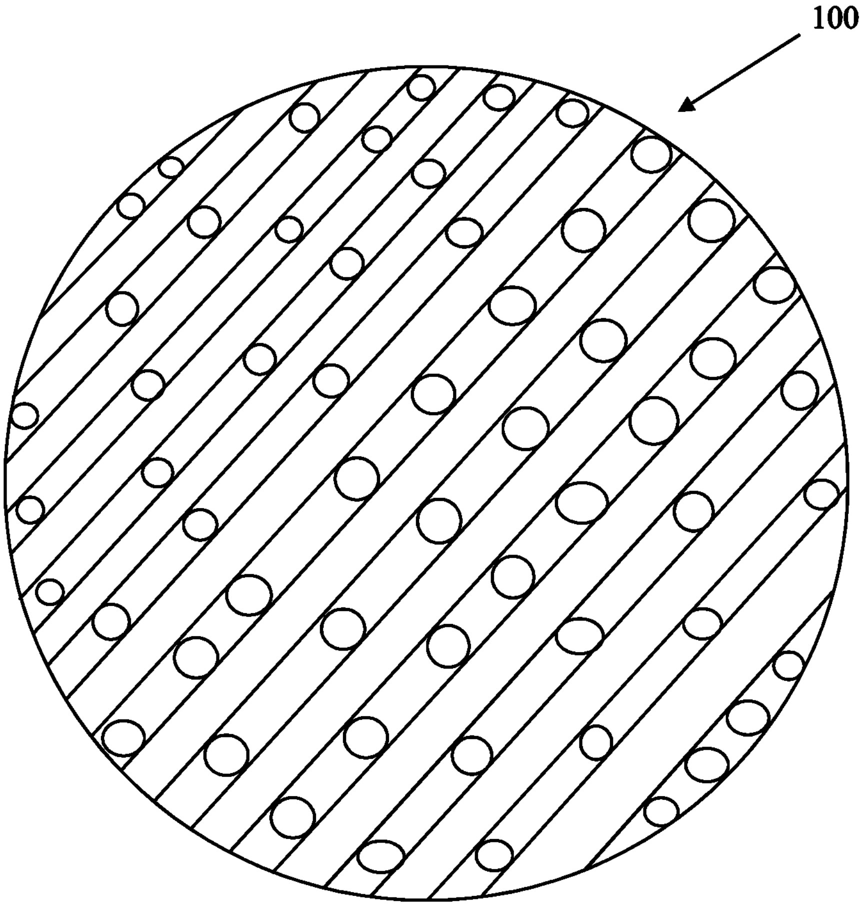
FIG. 1A is a front perspective view of a sandpaper product made of kraft paper and configured substantially in the shape of a disc.
Figure 2A:
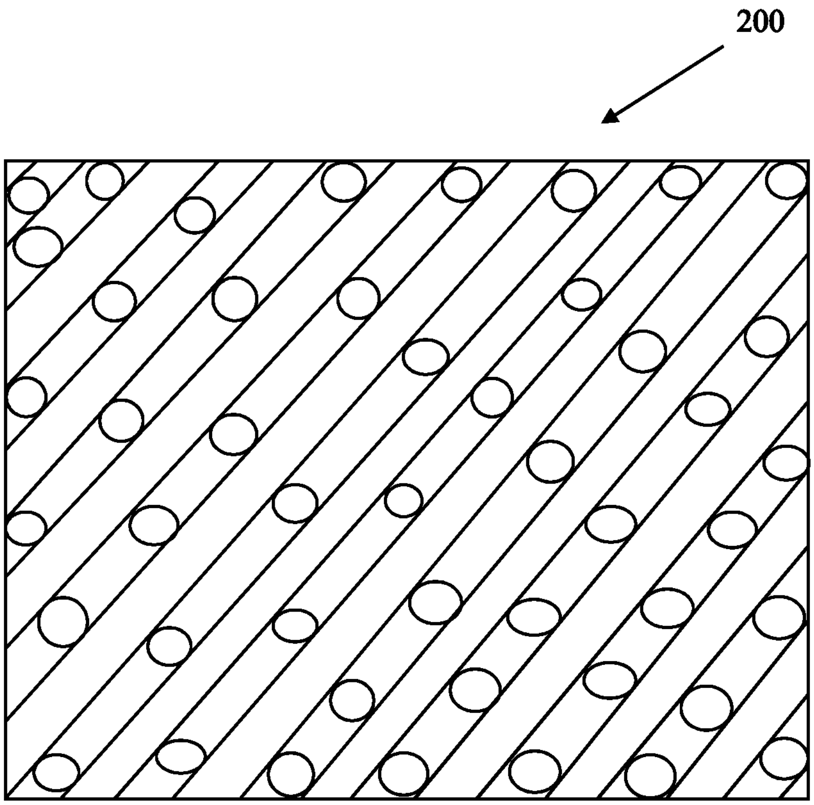
FIG. 2A is a front perspective view of a sandpaper product made of kraft paper and configured substantially in the shape of a square.
Figure 3A:
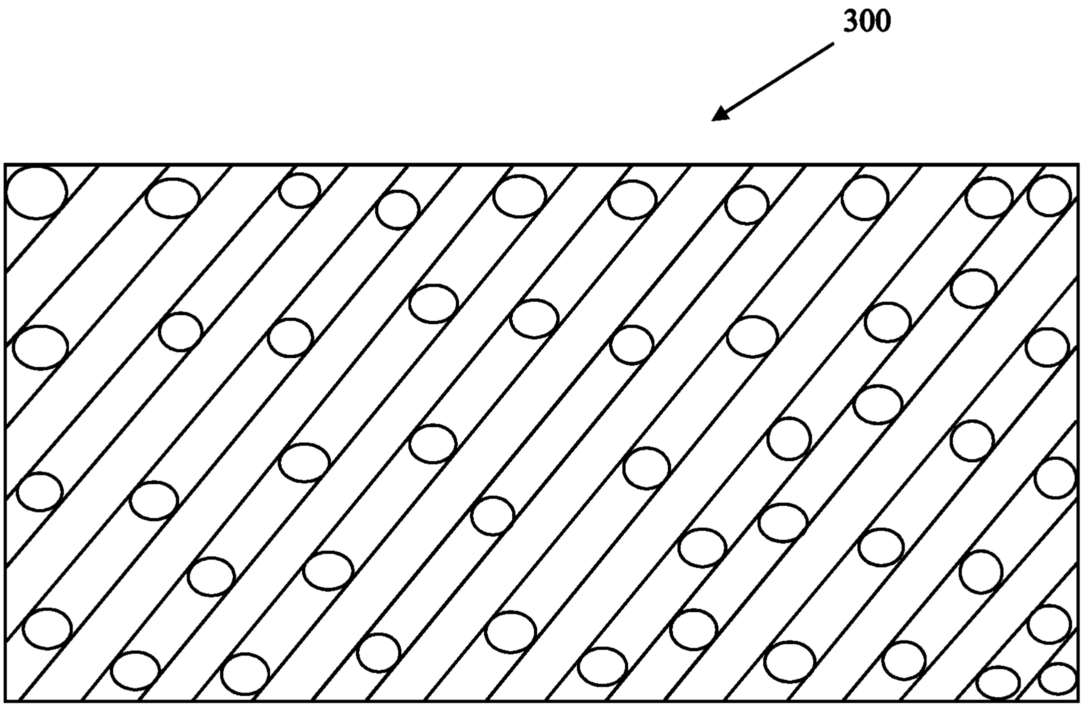
FIG. 3A is a front perspective view of a sandpaper product made of kraft paper and configured substantially in the shape of a rectangle.

With reference to FIGS. 1A, 2A and 3A, various embodiments of the present invention are depicted showing a sandpaper product comprised of an abrasive paper suitably configured to sand auto body parts made of plastic. The abrasive paper includes at least one outer sanding surface made of kraft paper 100/200/300. In other embodiments of the present invention, the kraft paper can be suitably configured into corrugated cardboard, which is also referred to in this disclosure as corrugated fiberboard, paperboard, corrugated paperboard, corrugated board or containerboard (CCM or corrugated case material). In this disclosure, the terms abrasive paper and sandpaper product are also referred to as kraft paper configured into corrugated cardboard, or these terms refer to corrugated cardboard, corrugated fiberboard, paperboard, corrugated paperboard, corrugated board or containerboard (CCM or corrugated case material) used for sanding auto body parts made of plastic.

Corrugated cardboard is a stiff, strong, and light-weight material that can be made up of more than two layers of brown kraft paper. Kraft paper or kraft is paper or paperboard (cardboard) produced from chemical pulp produced in the kraft process, which, like other paper production methods, involves the chemical conversion of wood into wood pulp. The structural components in wood are lignin and cellulose. Since lignin doesn't make good paper, it is separated from the cellulose. kraft paper is strong, due to its reduced lignin content and high sulfur ratio.

From paper mills, rolls of kraft paper are transported to a corrugating, or converting, plant. At the plant, layers of kraft paper are crimped and glued to form corrugated cardboard, which is then cut, printed, folded, and glued to make boxes. At the beginning of this process, kraft rolls from the paper mill are loaded into a huge machine called a corrugator. Some rolls of kraft paper are used as the corrugating medium, and others are used as liners, the layers of kraft paper glued on each side of the medium. After the corrugator has heated, glued, and pressed the kraft paper to form corrugated cardboard, the continuous sheet of cardboard is cut into wide box blanks that then go to other machines for printing, cutting, and gluing.

In other embodiments, corrugated fiberboard is a material consisting of a fluted corrugated sheet and one or two flat linerboards. It is made on "flute lamination machines" or "corrugators" and is used in the manufacture of shipping containers and corrugated boxes. The corrugated medium and linerboard board both are made of kraft containerboard, a paperboard material usually over 0.01 inches (0.25 mm) thick. Corrugated fiberboard and paperboard are sometimes called corrugated cardboard, although cardboard might be any heavy paper-pulp based board. Usually these containers are constructed of fiberboard, paperboard, cardboard and the like. Often, they are waxed or treated with other materials to attain desired waterproofing and other characteristics.

Containerboard, (CCM or corrugated case material) is a type of paperboard specially manufactured for the production of corrugated board. It includes both linerboard and corrugating medium (or fluting), the two types of paper that make up corrugated board. Since containerboard is made mainly out of natural unbleached wood fibers, it is generally brown, although its shade may vary depending on the type of wood, pulping process, recycling rate and impurities content. For certain boxes that demand good presentation, white bleached pulp or coating is used on the top ply of the linerboard that goes outside the box.

In alternative embodiments, the kraft paper 100/200/300 is virgin kraft.

Figure 1B:
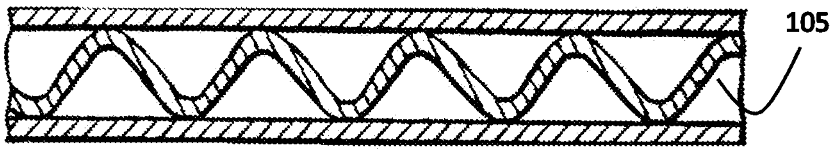
FIG. 1B is a sectional view of the sandpaper product shown in FIG. 1A according to one embodiment of the present invention when said sandpaper product is suitably configured into corrugated fiberboard material.
Figure 2B:
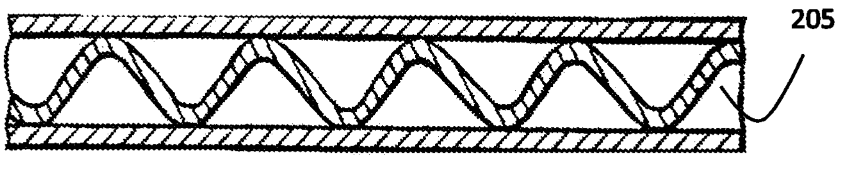
FIG. 2B is a sectional view of the sandpaper product shown in FIG. 2A according to one embodiment of the present invention when said sandpaper product is suitably configured into corrugated fiberboard material.
Figure 3B:
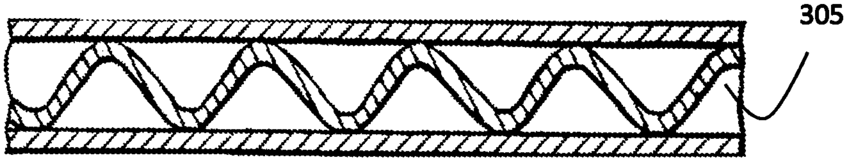
FIG. 3B is a sectional view of the sandpaper product shown in FIG. 3A according to one embodiment of the present invention when said sandpaper product is suitably configured into corrugated fiberboard material.

In another embodiment, the abrasive paper is arranged as corrugated fiberboard material 105/205/305 (See also FIGS. 1B, 2B and 3B).

In a further embodiment, the abrasive paper is affixed to a sanding device.

Referring still to FIGS. 1A, 2A and 3A, the sandpaper product for various embodiments of the present invention includes abrasive paper that is substantially configured in the shape of, but not limited to, a disc, square or rectangle.

One embodiment of the present invention also includes automobile body parts that are comprised of plastic car bumpers. In a further embodiment of the present invention, the car bumpers are comprised of thermoplastic olefin (TPO).

Thermoplastic olefin elastomers (TPO) constitute the largest single market of the automotive field because of its excellent weatherability, low density, and relatively low cost which makes TPO the current material of choice for automotive bumpers and fascias. At the beginning of the years 2000, the automotive segments were using 7 million ton/yr of polymers and polypropylene based materials accounted for 41%.

TPO are blends of isotactic polypropylene (PP) with ethylene-propylene rubber (ethylene-propylene monomer, EPM, or ethylene propylene-diene monomer, EPDM). The production by in situ synthesis of specialty ethylene-propylene copolymers extended their uses in a wide range of applications. They are flexible, tough and durable and, due to its components, can be modified to be weather-resistant, scratch-resistant, paintable, and low odor. They are flame retardant, and a recyclable alternative to rubber. Moreover, TPO is used for applications in automotive, building and construction, and battery applications. Some TPO is used for automotive components, including bumpers, interior and exterior trim, and floor mats.

As shown in FIGS. 1B, 2B, and 3B, a sectional view of the sandpaper product 105/205/305 is depicted according to various embodiments of the present invention when the sandpaper product is suitably configured into corrugated fiberboard material.

In operation, the sandpaper product can be used with or without a sanding device. If used without a sanding device, the sandpaper product can be configured as a flat sheet made of kraft paper or as corrugated fiberboard material (See FIGS. 1B, 2B and 3B) having an outer sanding surface 100/200/300 comprised of kraft paper. If attached to a sanding device, the sandpaper product can also be configured as a flat sheet made of kraft paper or as corrugated fiberboard material (See FIGS. 1B, 2B and 3B) having an outer sanding surface 100/200/300 comprised of kraft paper.

In operation, the sandpaper product is comprised of an abrasive paper having at least one outer surface 100/200/300 made of kraft paper that advantageously provides the proper amount of friction for sanding car parts made of TPO, namely car bumpers. The proper amount of friction is based on the outer sanding surface 100/200/300 of the sandpaper product which removes some of the raw surface of a car bumper made of TPO after becoming rough during the sanding process. For instance, the sandpaper product 100/200/300 will smooth out the raw surface of a car bumper made of TPO after it has become uneven, course, jagged, stringy, hairy and/or shredded during the sanding process. Importantly, the sandpaper product 100/200/300 will advantageously save shop owners and technicians time and money because they will no longer have to use and/or rely on the old sanding process which requires multiple grids of sandpaper and vast amounts of primer to cover up rough spots left on the car bumpers made of TPO.

In operation, the sandpaper product can also be suitably arranged in the shape of a disc, also referred to as a frictional disc (See FIG. 1A). In another embodiment, the sandpaper product can be suitably arranged in the shape of a square, also referred to as a frictional square (See FIG. 2A). In a further embodiment, the sandpaper product can be suitably arranged in the shape of a rectangle, also referred to as a frictional rectangle (See FIG. 3A).

Figure 4:
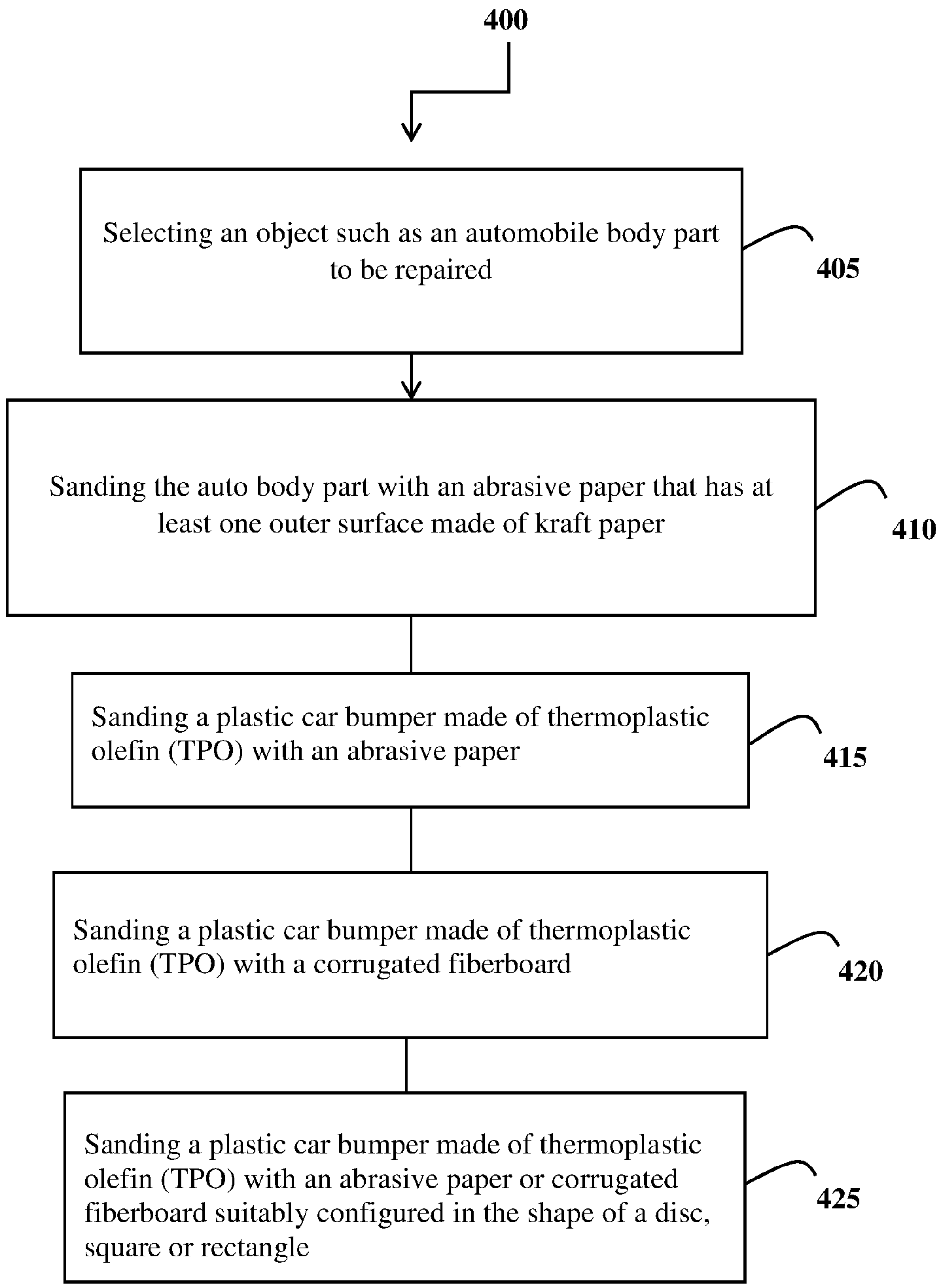
FIG. 4 represents an execution diagram for the method of sanding objects such as auto body parts, namely car bumpers, made of thermoplastic olefin (TPO).

FIG. 4 is an example execution diagram 400 performed according to an example of one embodiment of the present invention for sanding objects such as automobile body parts made of plastic. Starting at block 405, the process includes the step of selecting an object such as an automobile body part to be repaired. In another embodiment, the automobile body part to be repaired is a plastic car bumper. In a further embodiment, the car bumper is made of a thermoplastic olefin (TPO).

At block 410, the process includes the step of sanding the automobile body part with an abrasive paper that has at least one outer surface made of kraft paper.

At block 415, the process includes the step of sanding a plastic car bumper made of thermoplastic olefin (TPO) with an abrasive paper.

At block 420, the process includes the step of sanding a plastic car bumper made of thermoplastic olefin (TPO) with a corrugated fiberboard made of kraft paper.

At block 425, the process includes the step of sanding a plastic car bumper made of thermoplastic olefin (TPO) with an abrasive paper or corrugated fiberboard suitably arranged in the shape of a disc, square or rectangle.

Figure 5:
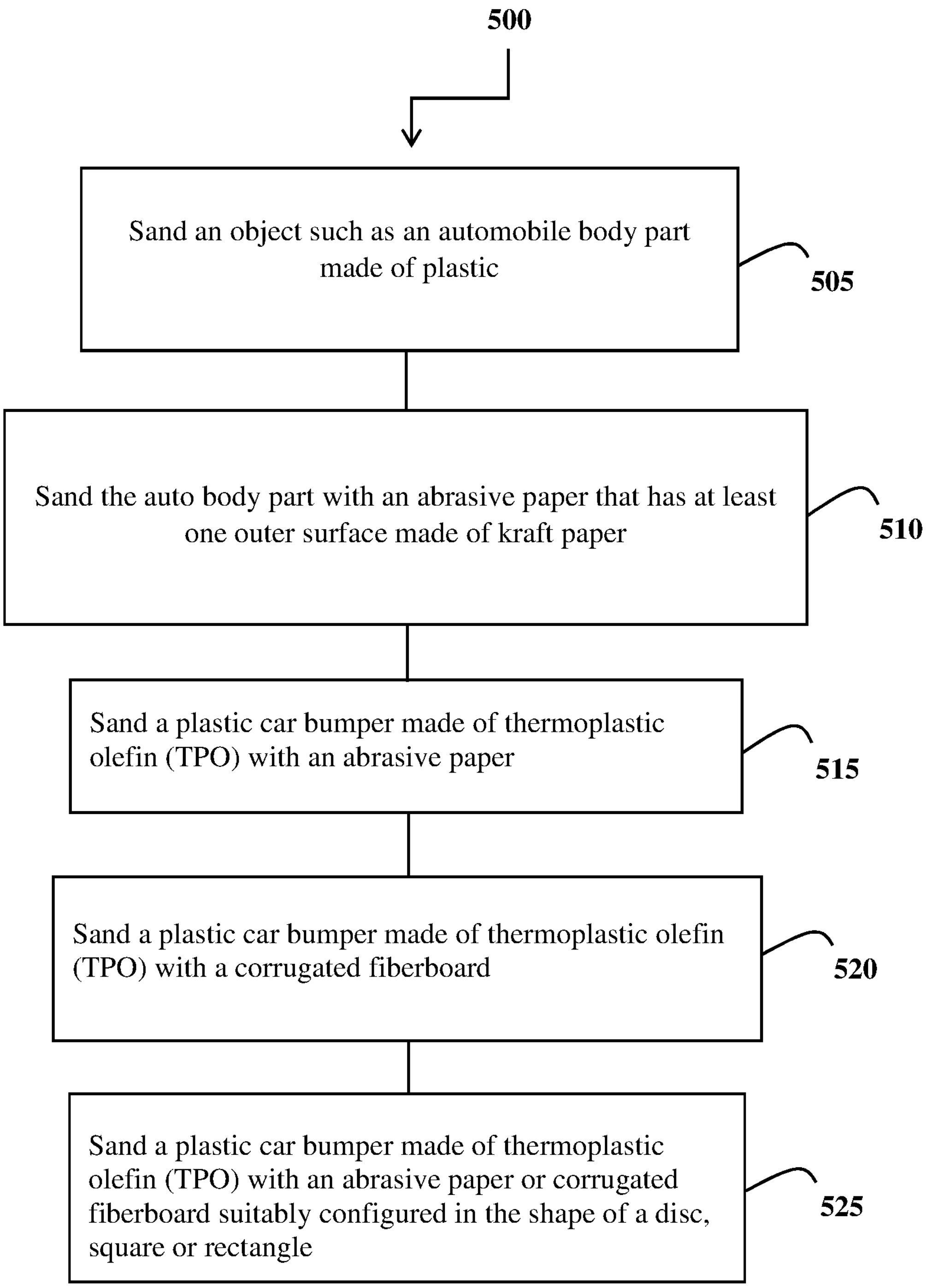
FIG. 5 represents a process diagram showing the specific functions that are executed by the sandpaper product for one embodiment of the invention.

In a further embodiment of the present invention, FIG. 5 depicts an example process of a system 500 used for sanding objects such as automobile body parts made of plastic with a sandpaper product. At block 505, the sandpaper product is suitably configured to sand automobile body parts made of plastic.

At block 510, the sandpaper product includes at least one outer surface made of kraft paper which is suitably arranged to sand automobile body parts made of plastic.

At block 515, the sandpaper product is configured to sand a plastic car bumper made of thermoplastic olefin (TPO) with an abrasive paper.

At block 520, the sandpaper product is configured to sand a plastic car bumper made of thermoplastic olefin (TPO) with corrugated fiberboard made of kraft paper.

At block 525, the sandpaper product is configured to sand a plastic car bumper made of thermoplastic olefin (TPO) with an abrasive paper or corrugated fiberboard that is suitably arranged in the shape of a disc, square or rectangle.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The present invention pertains to a method and system for sanding automobile body parts, specifically car bumpers made of thermoplastic olefin (TPO), with a sandpaper product made of abrasive paper having at least one outer sanding surface made of kraft paper, which may be of value or importance to various industries such as the automobile body repair industry.

What is claimed is:

1. A method of removing surface particles from a raw surface of an object made of plastic with kraft paper prior to a priming process, the method comprising the steps of:

providing a paper product to a user having an outer surface comprised of kraft paper; and prior to a priming process, removing surface particles disposed on and emanating from a raw surface of an outer perimeter of an object made of plastic by using the kraft paper to sand away the surface particles emanating from the raw surface of said object.

2. The method according to claim 1, wherein the kraft paper is virgin kraft.

3. The method according to claim 1, wherein the kraft paper is a corrugated fiberboard.

4. The method according to claim 1, wherein the kraft paper is substantially configured in the shape of a disc, square or rectangle.

5. The method according to claim 4, wherein the kraft paper is affixed to a sanding device.

6. The method according to claim 1, wherein the object is an automobile body part.

7. The method according to claim 6, wherein the automobile body part is a plastic car bumper.

8. The method according to claim 7, wherein the plastic is a thermoplastic olefin (TPO).

9. A method of removing surface particles from a raw surface of an object made of plastic with a kraft paper product, the method comprising the steps of:

providing a user with a paper product having an outer surface comprised of kraft paper;

selecting an object to be sanded, the object having an outer perimeter, wherein the outer perimeter of the object having a raw surface, and wherein the raw surface includes at least one area having surface particles protruding and emanating therefrom; and sanding the at least one area of the outer perimeter of the object with the outer surface of the kraft paper product to remove the surface particles protruding and emanating from the raw surface of the outer perimeter of the object with friction generated from the outer surface of the kraft paper prior to a priming process.

10. The method according to claim 9, wherein the kraft paper product is configured substantially in the shape of a disc, square or rectangle.

11. The method according to claim 10, wherein the kraft paper product is affixed to a sanding device.

12. The method according to claim 9, wherein the object is an automobile body part.

13. The method according to claim 12, wherein the automobile body part is a plastic car bumper.

14. The method according to claim 13, wherein the plastic is a thermoplastic olefin (TPO).

15. The method according to claim 9, wherein the kraft paper is virgin kraft, and wherein the kraft paper is a corrugated fiberboard.

16. The method according to claim 15, wherein the outer surface of the kraft paper has no grit, thereby allowing the outer surface of the kraft paper to make direct contact with the raw surface of the object to be sanded.

17. A method of removing surface particles from a raw surface of an object made of plastic with a kraft paper product, the method comprising the steps of:

providing a user with a paper product having an outer surface comprised of kraft paper;

selecting an object to be sanded, the object having an outer perimeter, wherein the outer perimeter of the object having a raw surface, and wherein the raw surface includes at least one area having surface particles protruding and emanating therefrom, wherein the surface particles are selected from the group consisting of uneven, course, rough, jagged, stringy, hairy, bristly, stubbly, and shredded particles; and prior to a primer process, sanding the at least one area to remove the surface particles disposed on and emanating from the raw surface of the outer perimeter of the object made of plastic with friction generated from the outer surface of the kraft paper, wherein the object to be sanded is a plastic automobile body part, and wherein the plastic is a thermoplastic olefin (TPO).

18. The method according to claim 17, wherein the outer surface of the kraft paper product has no grit, thereby allowing the outer surface of the kraft paper to make direct contact with the object to be sanded.

19. The method according to claim 17, wherein the kraft paper is virgin kraft, and wherein the kraft paper is a corrugated fiberboard.

20. The method of claim 17, wherein the plastic automobile body part is a plastic car bumper.

* * * * *